United States Patent
Courth et al.

(10) Patent No.: US 10,738,907 B2
(45) Date of Patent: Aug. 11, 2020

(54) ELECTROMAGNETIC VALVE, IN PARTICULAR FOR SLIP-REGULATED MOTOR VEHICLE BRAKE SYSTEMS

(71) Applicant: Continental Teves AG & Co. oHG, Frankfurt (DE)

(72) Inventors: Christian Courth, Frankfurt (DE); Christoph Voss, Frankfurt (DE); Holger Kollmann, Rodgau (DE); Christian Schulz, Riedstadt (DE); Heiko Gensert, Eppstein (DE)

(73) Assignee: Continental Teves AG & Co., oHG (DE)

( * ) Notice: Subject to any disclaimer, the term of this patent is extended or adjusted under 35 U.S.C. 154(b) by 123 days.

(21) Appl. No.: 16/078,149

(22) PCT Filed: Feb. 23, 2017

(86) PCT No.: PCT/EP2017/054103
§ 371 (c)(1),
(2) Date: Aug. 21, 2018

(87) PCT Pub. No.: WO2017/144554
PCT Pub. Date: Aug. 31, 2017

(65) Prior Publication Data
US 2020/0079340 A1 Mar. 12, 2020

(30) Foreign Application Priority Data
Feb. 26, 2016 (DE) .......................... 10 2016 203 035

(51) Int. Cl.
*F16K 31/06* (2006.01)
*H01F 7/16* (2006.01)

(52) U.S. Cl.
CPC ................ *F16K 31/06* (2013.01); *H01F 7/16* (2013.01)

(58) Field of Classification Search
CPC ..................................... F16K 3/06; H01F 7/16
See application file for complete search history.

(56) References Cited

U.S. PATENT DOCUMENTS

| 2,991,799 A * | 7/1961 | Littlefield ............. F16K 11/161 137/595 |
| 5,310,160 A | 5/1994 | Harck et al. |
| 6,385,511 B1 | 5/2002 | Fondeur et al. |

(Continued)

FOREIGN PATENT DOCUMENTS

| DE | 10064169 A1 * | 2/2002 | ......... F16K 31/0655 |
| DE | 10216485 A1 * | 3/2003 | ............. B60T 17/22 |

(Continued)

*Primary Examiner* — Umashankar Venkatesan
(74) *Attorney, Agent, or Firm* — RatnerPrestia

(57) ABSTRACT

An electromagnetic valve, having a valve closing element which is arranged in a valve housing and which is capable of opening or closing a valve passage in a valve seat, having a magnet armature provided for actuating the valve closing element, and having a substantially cylindrical restoring spring which is braced between the magnet armature and a magnet core. In a parallel arrangement with respect to the restoring spring, a spring ring is arranged between the magnet armature and the magnet core, which spring ring has a smaller number of spring windings in relation to the number of spring windings of the restoring spring.

8 Claims, 3 Drawing Sheets

(56) References Cited

U.S. PATENT DOCUMENTS

| | | | |
|---|---|---|---|
| 6,776,391 B1 * | 8/2004 | Goossens | B60T 8/363 |
| | | | 251/129.15 |
| 9,080,684 B2 * | 7/2015 | Stahr | H01F 7/081 |
| 9,249,894 B2 * | 2/2016 | Stahr | B60T 8/363 |
| 9,410,638 B2 * | 8/2016 | Ambrosi | F16K 31/0696 |
| 2005/0151104 A1 * | 7/2005 | Goossens | B60T 8/363 |
| | | | 251/129.19 |
| 2011/0204271 A1 * | 8/2011 | Kratzer | B60T 8/363 |
| | | | 251/129.15 |
| 2012/0248357 A1 | 10/2012 | Jeon | |
| 2012/0313022 A1 * | 12/2012 | Godbillon | B60T 8/363 |
| | | | 251/129.15 |
| 2016/0312912 A1 * | 10/2016 | Nakazawa | B60T 8/367 |

FOREIGN PATENT DOCUMENTS

| | | | | |
|---|---|---|---|---|
| DE | 102011052526 A1 | | 2/2013 | |
| DE | 102012200156 A1 * | | 7/2013 | B60T 13/686 |
| DE | 102015224540 A1 * | | 6/2017 | B60T 8/363 |
| DE | 102016201081 A1 | | 7/2017 | |
| DE | 102017201469 A1 * | | 8/2018 | H01F 7/081 |
| WO | WO-2004033945 A1 * | | 4/2004 | H01F 7/1607 |

\* cited by examiner

ELECTROMAGNETIC VALVE, IN PARTICULAR FOR SLIP-REGULATED MOTOR VEHICLE BRAKE SYSTEMS

CROSS REFERENCE TO RELATED APPLICATIONS

This application is the U.S. National Phase Application of PCT International Application No. PCT/EP2017/054103, filed Feb. 23, 2017, which claims priority to German Patent Application No. 10 2016 203 035.3, filed Feb. 26, 2016, the contents of such applications being incorporated by reference herein.

FIELD OF THE INVENTION

The invention relates to an electromagnetic valve, in particular for slip-controlled motor vehicle brake systems, as per the preamble of patent claim 1.

BACKGROUND OF THE INVENTION

EP 1231082 B1, incorporated by reference herein, has already disclosed an electromagnetic valve of the stated type, which has a valve closing element arranged in axially movable fashion in a valve housing, which valve closing element is capable of opening or closing a valve passage in a valve seat, for which purpose, in the valve housing, there are arranged a magnet armature and a substantially cylindrical restoring spring which is braced between the magnet armature and a magnet core. Furthermore, between the magnet armature and the magnet core, there is situated a spring washer, which permits continuously variable stroke control of the magnet armature in a manner dependent on the selected electromagnetic current intensity of a valve coil. The precise production of the spring washer without burrs and with thin walls entails high costs in order to ensure the desired spring characteristics.

SUMMARY OF THE INVENTION

An aspect of the present invention aims to provide an inexpensive design of an electromagnetic valve of the stated type with the simplest possible functional means, and to improve said electromagnetic valve such that the use of a spring washer can be dispensed with.

Further features and advantages of aspects of the invention will emerge from the following description of multiple exemplary embodiments on the basis of FIGS. 1 to 5.

DETAILED DESCRIPTION OF THE PREFERRED EMBODIMENTS

An aspect of invention relates to an electromagnetic valve which is closed in the basic position and which is preferably used in slip-controlled motor vehicle brake systems or electropneumatic control systems.

In the exemplary embodiments, an electromagnetic valve of said type accommodates, in a valve housing 1, a valve closing element which, under the permanent action of a restoring spring 8 arranged between a magnet armature 2 and a magnet core 5, is capable of closing a valve passage in a valve seat. To open up the valve passage, the magnet armature 2 connected to the valve closing element is, in a manner known per se, electromagnetically actuated in the direction of the magnet core 5 by means of a valve coil.

A graphic illustration of the valve coil, of the valve closing element and of the valve seat which has the valve passage is omitted, because these elements are generally known and may be designed as desired.

Figure 1:
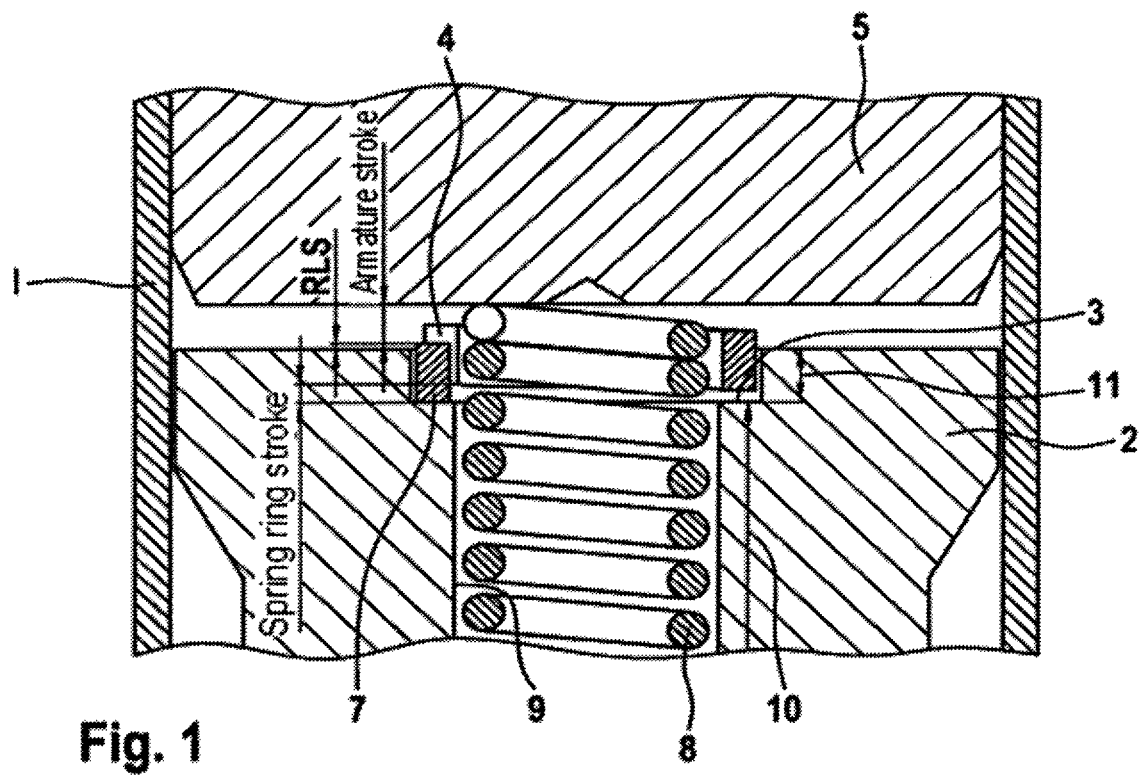
FIG. 1 shows, in longitudinal section and in a partial illustration, the elements essential to an aspect of the invention of an electromagnetic valve which is closed in the basic position, the restoring spring of which electromagnetic valve is arranged together with a spring ring between a magnet core and a magnet armature.

As can be seen from FIG. 1, according to an aspect of the invention, in a parallel arrangement with respect to the restoring spring 8, a spring ring 7 is arranged between the magnet armature 2 and the magnet core 5, which spring ring, in a coaxial arrangement together with the restoring spring 8, is received in sections in a bore 9 which in the figure is arranged in the magnet armature 2, although the bore 8 for receiving the restoring spring 8 and the spring ring 7 may alternatively also be arranged in the magnet core 5.

The relatively soft restoring spring 8, which is braced between the magnet armature 2 and the magnet core 5, thus extends, owing to the spring length required on account of the large number of spring windings, centrally through the spring ring 7, such that the spring ring 7 equipped with a single spring winding cannot move laterally out of its position.

To receive the restoring spring 8, the bore 9 has a first bore section 10, which is adapted to the length of the restoring spring 8, and a second bore section 11, which is adapted to the spring ring 7, wherein, to receive the spring ring 7 which is of enlarged diameter in relation to the restoring spring 8, the second bore section 11 imperatively has, in relation to the first bore section 10, a larger diameter, which is adapted to the diameter of the spring ring 7.

The diameter difference between the two bore sections 10, 11 advantageously has the result that, for the axial support of the spring ring 7 in the second bore section 11, a bore step 3 is formed between the first bore section 10 and the second bore section 11, wherein the second bore section 11 for receiving the spring ring 7 in sections has a depth which is smaller both in relation to the height of the spring ring 7 and in relation to the first bore section 10, which depth is defined by the position of the bore step 3, on which the spring ring 7 is supported in sections, in the bore 9.

Both the restoring spring 8 and the spring ring 7 project out of the bore 9 in each case with a defined projecting length, wherein, to define the residual air gap RLS, the spring ring 7 has, in relation to the restoring spring 8, a considerably smaller projecting length than the restoring spring 8 itself, which, owing to its position permanently braced between the magnet armature 2 and the magnet core 5, has a projecting length which corresponds to the maximum stroke of the magnet armature 2. The stroke of the spring ring 7 is defined by its helical gradient, such that, as per the figure, in the non-excited state of the magnet armature 2, a gap remains in sections between the bore step 3 and the spring ring 7, until finally, owing to electromagnetic actuation of the magnet armature 2, the spring ring 7, under compression, comes into contact over the full area both with the magnet core 5 and with the base of the bore step 3.

Figure 2:
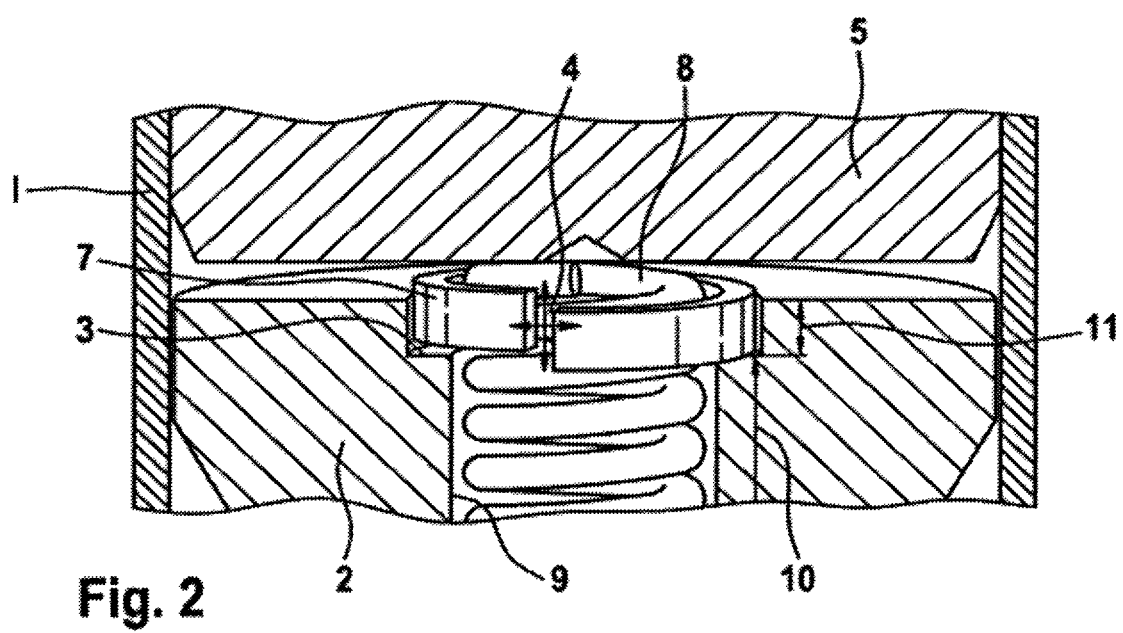
FIG. 2 shows, in a perspective view, the spring ring shown in FIG. 1 and equipped with a vertical slot.

From the perspective view in FIG. 2, it is clear that the two spring ends of the spring ring 7, which are offset with respect to one another to a greater or lesser extent in a manner dependent on the spring gradient, are spaced apart by a vertical slot 4, such that, in the electromagnetically non-excited state of the magnet armature 2, only the restoring spring 8 acts between the magnet core 5 and the magnet armature 2, whereas, in a manner dependent on the selected spring gradient, the spring ring 7 remains, with a greater or lesser amount of play, between the corresponding end surfaces of the magnet armature 2 and of the magnet core 5.

Figure 3:
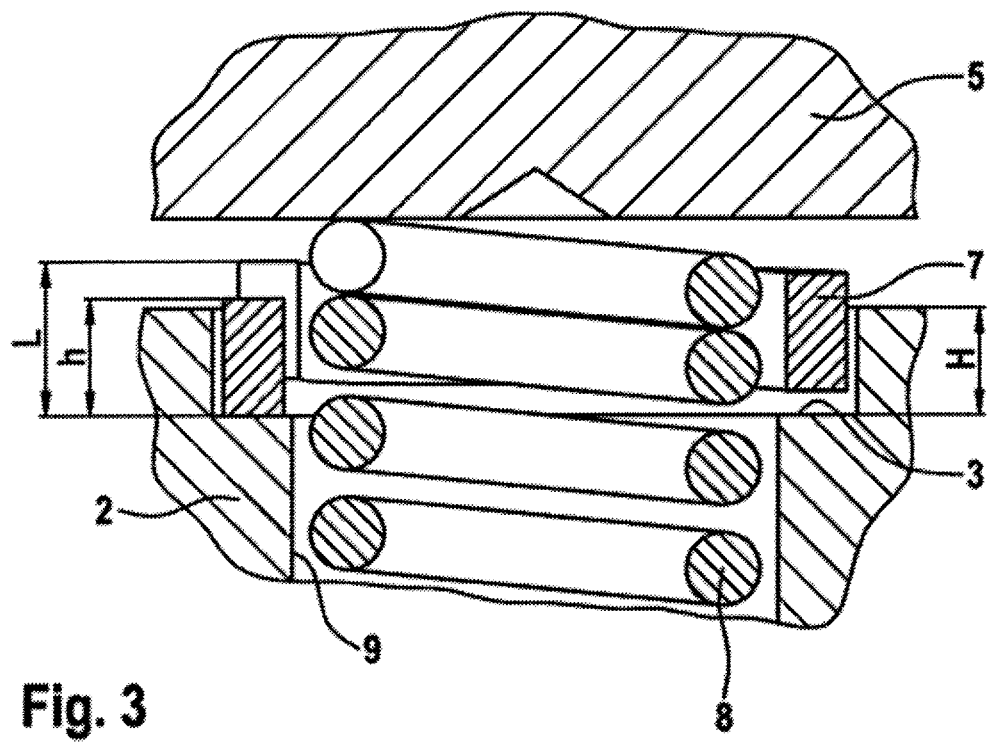
FIG. 3 shows the spring ring known from FIG. 1 and inserted into a bore section of widened diameter in the magnet armature in a yet further enlarged illustration for the purposes of clarifying the individual features in conjunction with the structural dimensions.

FIG. 3 shows the spring ring 7 known from FIGS. 1 and 2 in a yet further enlarged illustration for the purposes of clarifying the individual structural dimensions, according to which, for the definition of the residual air gap RLS, the height H of the second bore section 11 is smaller than the minimum height h of the spring ring 7 in the relaxed spring state. The gradient of the spring ring 7 results, in the decompressed state, in a maximum spring ring height L, which is greater than a wire height h of the spring ring 7. Analogously to a conventional compression spring, it is thus the case in the electromagnetically actuated state of the magnet armature 2 that the spring ring 7 is pressed against the magnet core 5 and, in the process, is compressed from the dimension of the spring ring height L to the minimum height h, which corresponds to the block height h of the spring ring 7, wherein the stiffnesses of the restoring spring 8 and of the spring ring 7 are added together during the compression of the spring ring 7. Thereafter, the spring ring 7 acts as a rigid, geometrically exact residual air gap delimiting element.

Owing to the compact design, the spring ring 7 ensures, with unrestricted repeatability, that the residual air gap RLS is precisely maintained even under the action of an excess magnetic force.

Figure 4:
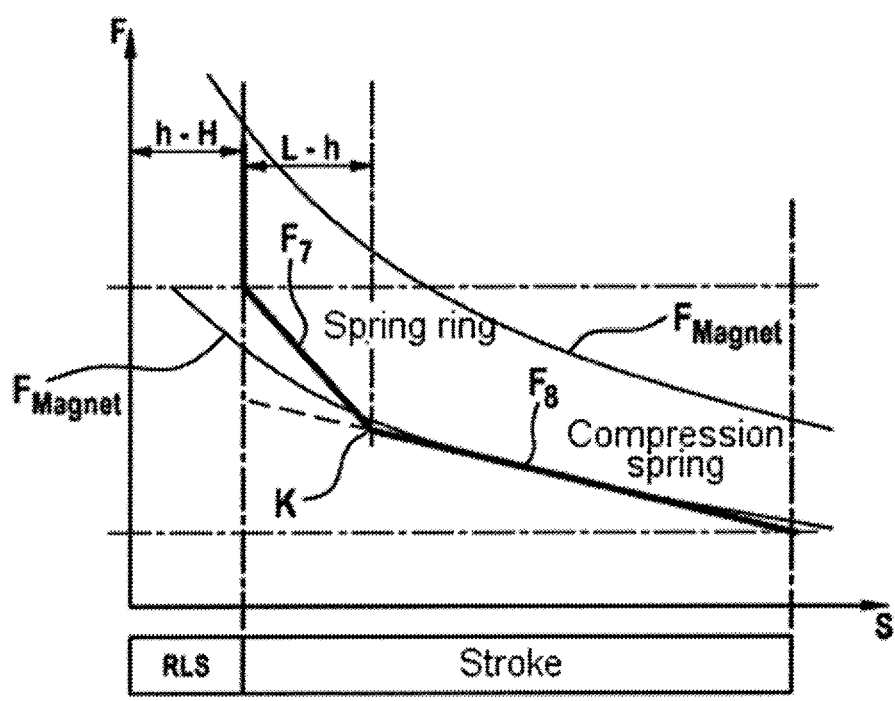
FIG. 4 shows a diagram of spring force and magnet force for clarifying the action of the spring ring according to an aspect of the invention.

As furthermore emerges from the diagram as per FIG. 4, the spring ring 7 has a spring stiffness which differs from, and is much higher than, that of the restoring spring 8. The spring ring 7 thus satisfies the requirement for storing the highest possible kinetic energy density in a short spring travel, and, for this purpose, is wound in spiral form from non-magnetizable, standardized spring steel by known production methods.

In the diagram in FIG. 4, the magnet armature stroke S in conjunction with the residual air gap RLS are plotted along the abscissa, and the (spring and magnetic) force profile F, $F_{Magnet}$ are plotted along the ordinate. Referring back to FIG. 3, the essential structural dimensions L, h of the spring ring 7, and the height H of the bore section 11 that receives the spring ring 7, are also plotted in the diagram.

The straight line which initially rises in a shallow manner in the direction of the residual air gap RLS shows the linear rise of the spring force $F_8$ of the restoring spring 8 with increasing magnet armature stroke S for the electromagnetic valve according to an aspect of the invention, such that, owing to the relatively low spring stiffness of the restoring spring 8, the magnetic force $F_{Magnet}$ required for the actuation of the magnet armature 2 is initially relatively low over a part of the stroke of the magnet armature 2 until the bend point K is reached. Only when the characteristic curve bend point K, which corresponds to the point at which the spring ring 7 makes contact with the magnet core 5, is reached does the gradient of the bend characteristic curve increase significantly owing to the abutment of the spring ring 7 against the magnet core 5, because the spring ring 7 has a higher spring stiffness than the restoring spring 8, such that a considerable increase in force to the spring force $F_7$ occurs only when the residual air gap RLS remains between the magnet armature 2 and the magnet core 5 owing to the compression of the spring ring 7, which advantageously permits a reduction in size of the residual air gap RLS in order to effect an adequately large restoring force after the ending of the electromagnetic excitation of the magnet armature 2.

The presented design of the spring ring 7 therefore has the advantage that, in conjunction with the restoring spring 8 arranged in parallel, a considerably higher spring stiffness is realized in the range of small air gaps and thus high magnetic forces acting between magnet armature 2 and magnet core 5. By contrast, at the start of the stroke of the magnet armature 2, the spring ring 7 is not active, and the restoring spring 8, which is advantageously designed for low stiffness, can act on its own owing to the relatively shallow magnetic force gradient.

Furthermore, taking into consideration the characteristic curves representing the magnetic force $F_{Magnet}$, it is clear that, if desired or required, the residual air gap RLS can be reduced in size, with a simultaneous increase of the spring force to the spring force $F_7$ when the spring ring 7 abuts against the magnet core 5, such that the electrical power of the valve coil can advantageously be reduced.

Figure 5:
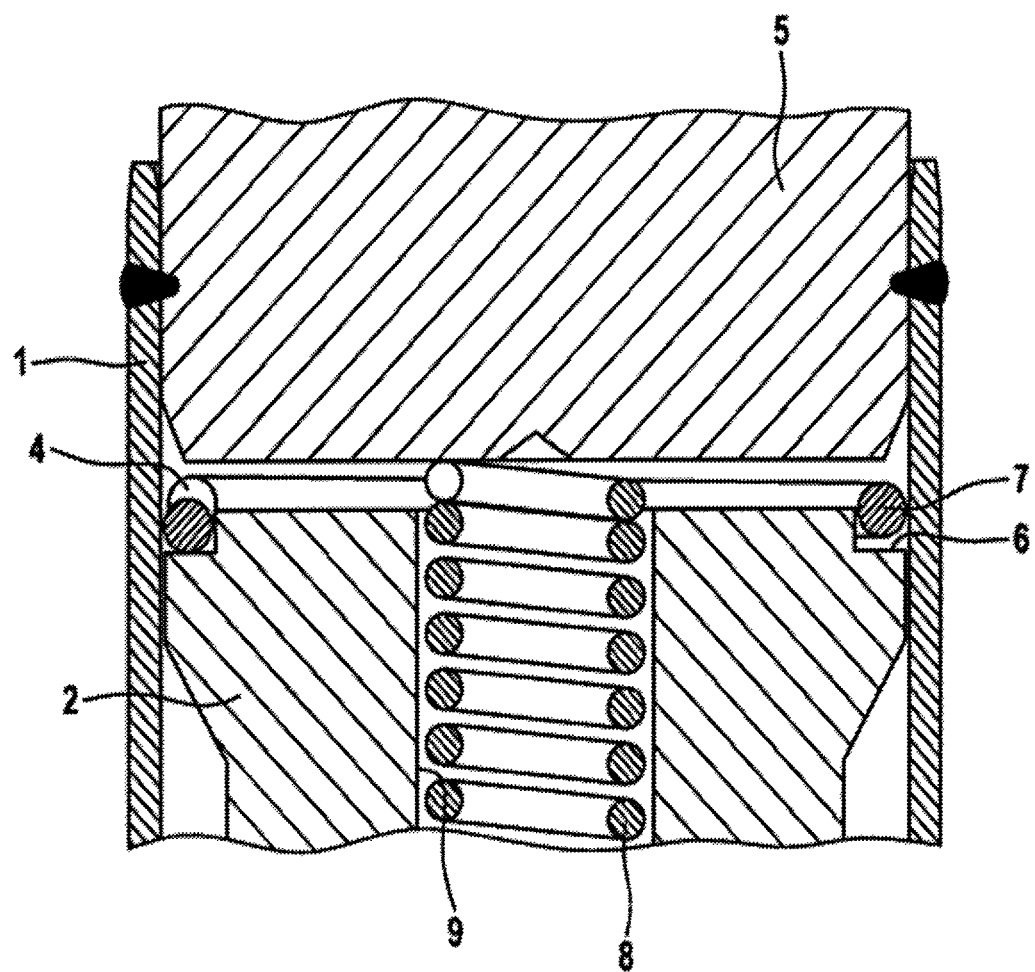
FIG. 5 shows an alternative arrangement and design of the spring ring.

Finally, FIG. 5 shows an alternative arrangement and design of the spring ring 7, according to which the spring ring 7 is now arranged outside the bore 9 between the magnet core 5 and the magnet armature 2, and now has a circular profile instead of the polygonal profile known from FIGS. 1-3. For the positioning of the spring ring 7 on the magnet armature 2, said spring ring preferably has, on its outer circumference facing toward the magnet core 5, an encircling depression in the form of a shoulder 6 which, analogously to FIGS. 1-3, has a smaller height in relation to the height of the spring ring 7, whereby, in the compressed spring state, the spring ring 7 has, at the end surface of the magnet armature 2, a projecting length which, during the electromagnetic actuation of the magnet armature 2, defines the size of the residual air gap RLS between the magnet core 5 and the magnet armature 2.

The following advantages are also achieved:

The restoring spring 8 and the spring ring 7 can be produced easily by means of an automatic spring winding machine, The wire required for producing the spring ring 7 can be produced with fine tolerances with rust-resistant, non-magnetizable, standardized spring steel qualities in a particularly inexpensive manner in relation to previous residual air gap elements, Depending on the coordination between the residual air gap and the spring characteristic, the spring ring 7 may be used both for quiet analog and digital actuation of the electromagnetic valves.

A further advantage results from the possibility to provide a relatively soft design of the restoring spring 8 owing to the spring ring 7 that is used, which has an expedient effect on the production tolerances and production costs owing to the relatively low spring stiffness.

Even though only a single spring ring 7 is disclosed in an aspect of the invention, this does not rule out the use of multiple spring rings 7 positioned in parallel. In general, the cross section of the spring ring 7 may have different contours with only one or multiple windings. In this way, the stiffness can be changed while maintaining the same wire cross section. Aside from the rectangular cross section presented in FIGS. 1-3, simpler circular-section wires or elliptical-section wires as per FIG. 5 are also suitable for realizing the spring ring 7. Furthermore, by varying the spring gradient, it is possible to realize both a degressive and a progressive spring characteristic.

List of Reference Designations
1 Valve housing
2 Magnet armature
3 Bore step
4 Vertical slot
5 Magnet core
6 Shoulder
7 Spring ring
8 Restoring spring
9 Bore
10 Bore section
11 Bore section

The invention claimed is:

1. An electromagnetic valve, for slip-controlled motor vehicle brake systems, having a valve closing element which is arranged in a valve housing and which opens or closes a valve passage in a valve seat, having a magnet armature provided for actuating the valve closing element, and having a substantially cylindrical restoring spring which is braced between the magnet armature and a magnet core, wherein, in a parallel arrangement with respect to the restoring spring, a spring ring is arranged between the magnet armature and the magnet core, which spring ring has a smaller number of spring windings in relation to a number of spring windings of the restoring spring, and wherein, in a coaxial arrangement, the restoring spring and the spring ring are received in sections in a bore which is provided either in the magnet armature or in the magnet core, the bore having a first bore section for receiving the restoring spring and a second bore section for receiving the spring ring, wherein, for the receiving of the spring ring in the second bore section, the second bore section has a larger diameter in relation to the first bore section.

2. The electromagnetic valve as claimed in claim 1, wherein, for axial support of the spring ring in the second bore section, a bore step is provided between the first bore section and the second bore section, and the second bore section for receiving the spring ring in sections has a smaller height in relation to the first bore section, which height is defined by a position of the bore step, on which the spring ring is supported, in the bore.

3. The electromagnetic valve as claimed in claim 1, wherein both the restoring spring and the spring ring each project out of the bore to a defined extent so as to form a projecting length, wherein the spring ring has a smaller projecting length in relation to the restoring spring.

4. The electromagnetic valve as claimed in claim 1, wherein the spring ring has a different spring stiffness in relation to the restoring spring.

5. The electromagnetic valve as claimed in claim 4, wherein the spring ring has a higher spring stiffness in relation to the restoring spring.

6. The electromagnetic valve as claimed in claim 1, wherein the spring ring has a larger spring winding cross section in relation to the restoring spring.

7. The electromagnetic valve as claimed in claim 1, wherein the spring winding of the spring ring has either a circular, oval or polygonal wire cross section.

8. An electromagnetic valve, for slip-controlled motor vehicle brake systems, having a valve closing element which is arranged in a valve housing and which opens or closes a valve passage in a valve seat, having a magnet armature provided for actuating the valve closing element, and having a substantially cylindrical restoring spring which is braced between the magnet armature and a magnet core, wherein, in a parallel arrangement with respect to the restoring spring, a spring ring is arranged between the magnet armature and the magnet core, which spring ring has a smaller number of spring windings in relation to a number of spring windings of the restoring spring, and wherein the spring ring is positioned on the outer circumference of the magnet armature, for which purpose the magnet armature has, on its end surface facing toward the magnet core, a step-like shoulder, a height of which is smaller than a height of the spring ring, wherein, in the compressed spring state, the spring ring has, at the end surface of the magnet armature, a projecting length which, during electromagnetic actuation of the magnet armature, defines a size of a residual air gap between the magnet core and the magnet armature.

* * * * *